G. A. & C. J. PIEPER.
MANURE TRUCK.
APPLICATION FILED APR. 14, 1909.
952,711.
Patented Mar. 22, 1910.
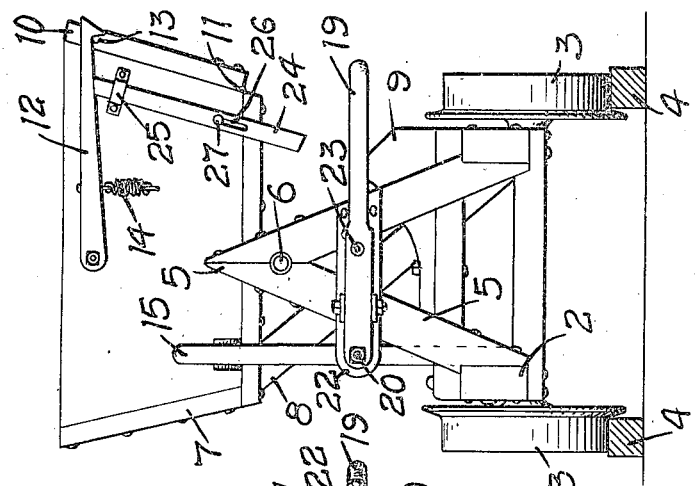
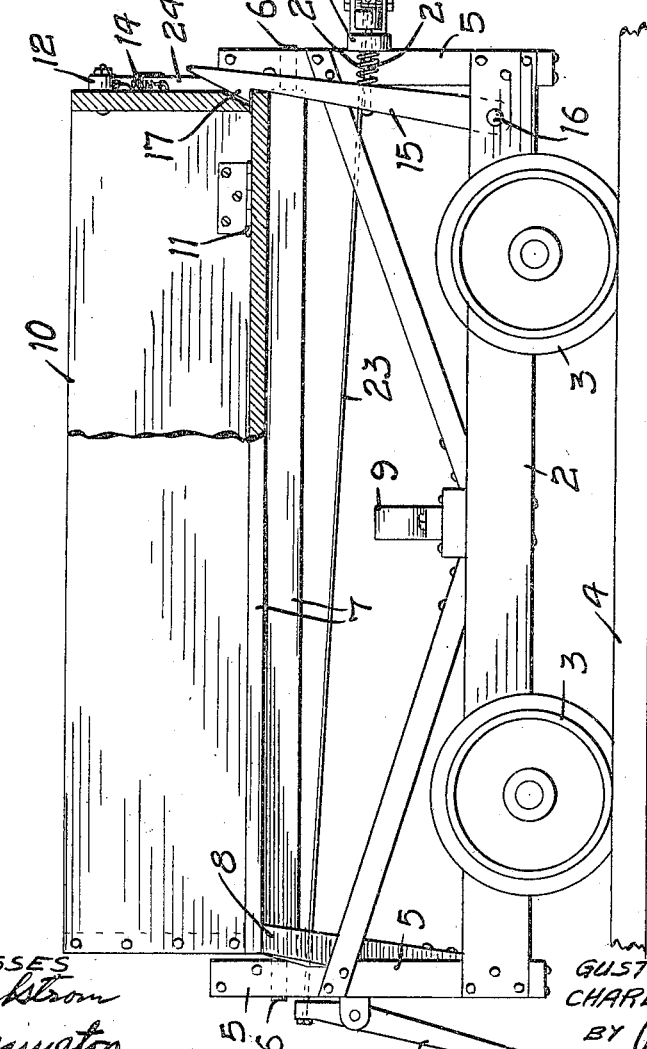
WITNESSES
INVENTORS
GUSTAV A. PIEPER
CHARLES J. PIEPER
BY Paul & Paul
THEIR ATTORNEYS G. A. & C. J. PIEPER.
MANURE TRUCK.
APPLICATION FILED APR. 14, 1909.
952,711.
Patented Mar. 22, 1910.
2 SHEETS—SHEET 2.
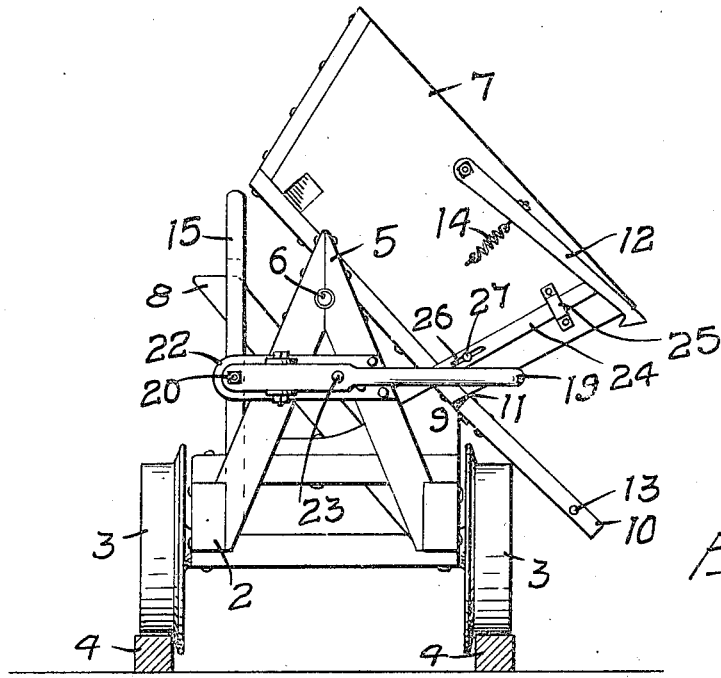
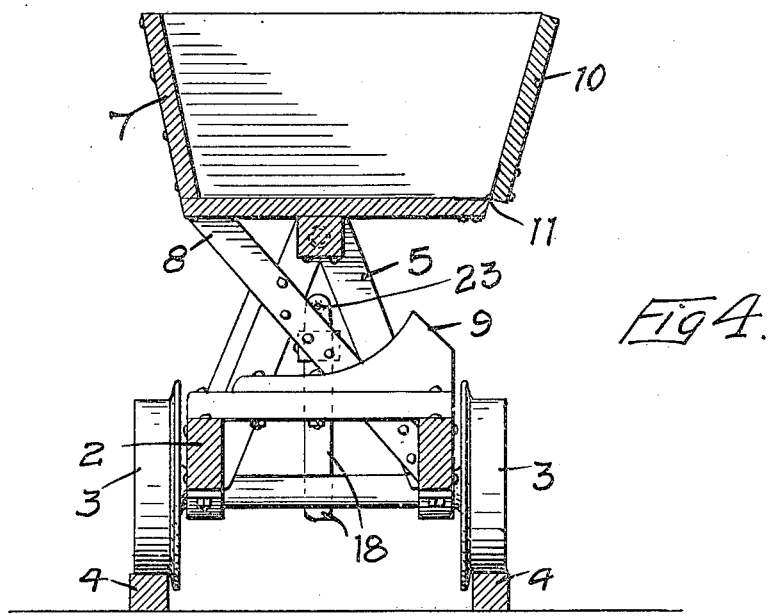
WITNESSES
INVENTORS
GUSTAV A. PIEPER
CHARLES J. PIEPER
BY Paul & Paul
THEIR ATTORNEYS

UNITED STATES PATENT OFFICE.

GUSTAV A. PIEPER AND CHARLES J. PIEPER, OF LORETTO, MINNESOTA.

MANURE-TRUCK.

952,711. Specification of Letters Patent. Patented Mar. 22, 1910.

Application filed April 14, 1909. Serial No. 489,798.

*To all whom it may concern:*

Be it known that we, GUSTAV A. PIEPER and CHARLES J. PIEPER, of Loretto, Hennepin county, Minnesota, have invented certain new and useful Improvements in Manure-Trucks, of which the following is a specification.

The object of our invention is to provide a manure truck, by means of which the litter and manure around a barn or stable can be easily and quickly transported to a point at a distance from the barn and automatically dumped, a suitable track or way being provided on which the truck travels to and fro.

Our invention consists generally in means for tripping a locking device to allow the truck body to tilt to an inclined position and to release one side of the body and allow it to swing down and permit the contents of the truck body to be discharged.

In the accompanying drawings, forming part of this specification, Figure 1 is a side view, partially in section of a manure truck, embodying our invention, Fig. 2 is an end view of the same, Fig. 3 is an end view, showing the truck with the body in its tilted position, Fig. 4 is a transverse, vertical, sectional view, illustrating the tilting body in a horizontal position.

In the drawing, 2 represents a truck frame, having wheels 3 adapted to run on a track 4. At each end of the truck frame, we provide supporting standards 5 in the form of a frame, said standards having bearings for trunnions 6 provided on the ends of the truck body 7 and on these trunnions the body is adapted to swing from a horizontal to an inclined position. A stop 8 is provided to engage the under side of the truck body and limits its movement when it is swung to a horizontal position and a stop 9 is mounted on the truck frame and engages the truck body and limits its movement when swung to a horizontal position. The truck body has a side wall 10, hinged at 11 to the bottom of the body and adapted to swing down to an inclined position, when released, and form a continuation of the bottom of the truck body. This side wall is locked normally by means of a latch 12 adapted to engage a pin 13 and held in yielding engagement therewith by a spring 14. The car body is held in its horizontal position by means of a latch 15 pivoted at 16 on the truck frame and having a hooked end 17, which engages the bottom of the car body. This latch is released by any suitable means, but we prefer to employ the following described mechanism.

At the ends of the car are levers 18 and 19, the lever 18 being vertically arranged and the lever 19 horizontally, and pivoted at points intermediate to their ends. A rod 20 connects the lever 19 with the latch 15 and a spring 21, interposed between the latch 15 and a bar 22 through which the rod 20 passes, normally tends to hold the latch 15 in engagement with the end of the car body. The lever 19 is connected on the other side of its pivot by a rod 23 with a lever 18. We are thus able to trip the truck body at either end of the car and this tripping is easily effected by means of a stake or some obstruction placed in the path of the car, the stake of course being capable of movement so that the dumping operation can be effected at any point along the track.

Assuming that the car has been loaded and pushed out on the track, the lever 18, upon coming in contact with the obstruction, will trip the lever 19 and disengage the latch 15 from the end of the car, which, owing to the fact that it is pivoted slightly off the center, as indicated in Fig. 2, will tilt by gravity to the position indicated in Fig. 3, until the bottom of the car body engages the stop 9. At this point, a bar 24, slidable in a guide 25, and having a slot 26 to receive a pin 27 on the end of the car, will contact with the standard 5 and the bar being moved lengthwise, will engage the latch 12 and lift it against the tension of the spring 14 and release the hinged side wall of the car body, whereupon it will swing down to the position shown in Fig. 3, and form a continuation of the bottom of the car body and direct the load over the wheels to the desired dumping place beside the track. We are thus able to dump the load at any desired point without the necessity of following the car or having any connection therewith.

We claim as our invention:—

1. A dumping truck comprising a frame and carrying wheels therefor, adapted to run upon a track, a car body, A-shaped standards provided at each end of said frame and in the upper portion of which the ends of said car body are pivoted, a latch pivoted at its lower end on said car frame and having a hook at its upper end to engage said car body and lock it in its horizontal position, a lever pivoted at one end on one of said standards and arranged to depend and contact with an obstruction on track, a second lever pivoted on the opposite standard and connected with said locking latch, a spring interposed between said latch and said second lever and normally tending to hold said latch in its locking position, an operating rod connecting said second lever with said first named or trip lever, substantially as described.

2. A dumping car comprising a frame having carrying wheels, A-shaped standards provided at each end of said car frame, a car body pivoted between the upper portions of said standards, said car having a hinged side wall, a latch pivoted on said car body and arranged to engage and lock said hinged side wall in its closed position, a vertically sliding bar mounted in guides on said car body and having its lower end arranged to contact with the car frame when said car body has reached a predetermined point in its tilting movement, means for locking said car body in its horizontal position and means for tripping said locking means.

3. A dumping car comprising a frame having carrying wheels adapted to run upon a track, A-shaped standards provided at each end of said frame, a car body journaled in said standards and adapted to tilt sidewise to discharge its load, a stop for limiting the tilting movement of said car body in one direction, a side wall hinged at its lower edge on said car body, means for locking said hinged side wall, means for locking said car body in its normal horizontal position, means actuated by an obstruction on the track for tripping said car body locking means and means actuated after the initial tilting movement of said car body for tripping said side wall and locking means, for the purpose specified.

4. A dumping car comprising a frame having carrying wheels and standards on said frame, a car body journaled between said standards, means for locking said car body in its normal horizontal position, a side wall hinged at its lower edge to said car body and adapted to swing downwardly to its dumping position, means for locking said side wall in its closed position, said side wall when lowered bridging the wheels and acting as a guide for the material in the car, means for tripping said car body locking means and means actuated by the tilting movement of the car body for releasing said side wall locking means, substantially as described.

5. A dumping car comprising a frame having carrying wheels and standards on said frame, a side dump car body journaled between said standards, means for locking said car body in its normal horizontal position, a side wall hinged at its lower edge to said car body and adapted to swing downwardly to its dumping position, means for locking said side wall in its closed position, said side wall, when lowered, bridging the wheels and acting as a guide for the material in the car, means for tripping said car body locking means and means for releasing said side wall locking means.

In witness whereof, we have hereunto set our hands this 10th day of April 1909.

GUSTAV A. PIEPER.
CHARLES J. PIEPER.

Witnesses:
CLARA HILLSTROM,
CLARA M. HILLSTROM.